United States Patent [19]

Sharaby et al.

[11] Patent Number: 5,006,607
[45] Date of Patent: Apr. 9, 1991

[54] DISPERSANT SYSTEM FOR MAKING POLYVINYL CHLORIDE WHICH PRODUCES LOW COLOR CHLORINATED POLYVINYL CHLORIDE

[75] Inventors: Zaev Sharaby, South Euclid; Robert G. Vielhaber, Avon, both of Ohio

[73] Assignee: The B. F. Goodrich Company, Brecksville, Ohio

[21] Appl. No.: 416,203

[22] Filed: Oct. 2, 1989

[51] Int. Cl.$^5$ .............................................. C08F 8/22
[52] U.S. Cl. ................ 525/356; 525/331.6; 526/200; 526/224; 526/344
[58] Field of Search ................ 525/331.6, 356; 526/200, 224, 344

[56] References Cited

U.S. PATENT DOCUMENTS 4,471,096  9/1984  Sharaby et al. .
4,612,345  9/1986  Hess .
4,797,458  1/1989  Sharaby .

Primary Examiner—Bernard Lipman
Attorney, Agent, or Firm—Daniel J. Hudak; Joe A. Powell

[57] ABSTRACT

Chlorinated polyvinyl chloride (CPVC) is prepared from polyvinyl chloride (PVC). When PVC is made utilizing polyvinyl alcohol, the low molecular weight CPVC compound so prepared is colored. A low molecular weight CPVC compound prepared from PVC that was made in the presence of a cellulose ether instead of polyvinyl alcohol resulted in a very low color compound having a DE of O by definition. However, a CPVC compound prepared from PVC made in the presence of polyvinyl alcohol resulted in a relatively high color (DE 18.51). During the polymerization of vinyl chloride, polyvinyl alcohol is replaced with the hydroxypropylmethyl cellulose ether having a methoxyl substitution of 15-35 percent and a hydroxypropoxyl substitution of from 4-35 percent.

17 Claims, No Drawings

DISPERSANT SYSTEM FOR MAKING POLYVINYL CHLORIDE WHICH PRODUCES LOW COLOR CHLORINATED POLYVINYL CHLORIDE

FIELD OF THE INVENTION

This invention relates to a low color chlorinated polyvinyl chloride (CPVC) composition as well as the preparation thereof. The low color is due to the type of polymerization additive employed in the polymerization of vinyl chloride to obtain polyvinyl chloride (PVC). The typical polymerization additives used in the making of PVC were found to cause discolorated CPVC products. It has been found that polyvinyl alcohol in general and especially low to medium hydrolysis polyvinyl alcohol are the major contributors to the discoloration of CPVC.

BACKGROUND

U.S. Pat. No. 4,612,345 (Hess, Sept. 16, 1986) relates to suspending agents of the hydroxypropyl methyl cellulose type and to a process for preparing vinyl chloride polymers by suspension polymerization of vinyl chloride wherein hydroxypropyl methyl cellulose ethers are used as suspending agents.

This patent provides new suspending agents of the hydroxypropyl methyl cellulose type for suspension polymerization of vinyl chloride which do not have the deficiencies of the known suspending agents of this type. This reference also provides new suspending agents of the hydroxypropyl methyl cellulose type for suspension polymerization of vinyl chloride which suspending agents are useful for increasing or controlling the porosity of the produced polyvinyl chloride particles.

U.S. Pat. No. 4,797,458 (Sharaby, Jan. 10, 1989) relates to polymers of vinyl halides having low molecular weight, good particle characteristics and improved melt flow. The polymers are made by aqueous polymerization utilizing an effective amount of a mercaptan as a chain transfer agent, wherein the mercaptan chain transfer agent is mixed with at least one material which is non-polymerizable with vinyl chloride and wherein non-polymerizable material is substantially insoluble in water and is miscible with said mercaptan to form a chain transfer composition. The chain transfer composition is added before the start of the polymerization while maintaining colloidal stability.

U.S. Pat. No. 4,471,096 (Sharaby et al, Sept. 11, 1984) relates to a process for the production of vinyl chloride polymers. It has been found that mercapto organic compounds having at least one beta-ether linkage are highly efficient chain-transfer agents in the production of vinyl chloride polymers that do not have the disadvantages of the previously known chain-transfer agents. These chain-transfer agents do not affect the color, odor, and other physical properties of the polymers and do not cause pollution problems.

SUMMARY OF THE INVENTION

This invention is directed to a composition of a chlorinated polyvinyl chloride polymer having improved color that does not utilize polyvinyl alcohol as well as a method for its preparation. A polymer so prepared by this process has utility as pipe and pipe fittings, molding around windows, doors and at baseboards, electrical equipment housings as well as products made by extension sheet blow injection molding and injection molding for home appliances. The composition and method involve polymerizing parts by weight of vinyl chloride optionally with a vinyl component monomer other than vinyl chloride in the from about 0.02 to about 0.5 parts by weight of a surfactant characterized in that the surfactant is a hydroxypropyl methyl cellulose ether having a methoxyl substitution of from 15 percent to 35 percent and a hydroxypropoxyl substitution of from 4 percent to 35 percent to form an intermediate, and (C) chlorinating said intermediate to obtain a chlorinated vinyl chloride polymer.

DESCRIPTION OF THE INVENTION

According to the present invention, chlorinated polymer compositions are provided wherein the polymerization of the monomer or comonomers occurs in the presence of at least one surfactant of hydroxypropyl methyl cellulose ether to yield a product having improved color as well as high Tg.

The hydroxypropyl methyl cellulose ethers used in the process of the present invention are commercially available and are defined primarily by their methoxyl substitution and hydroxypropoxyl substitution. The methoxyl and hydroxypropoxyl substitution are measured and calculated according to ASTM-D 2363. All the percentages of substitution are by weight of the finally substituted material.

The methoxyl substitution of the hydroxypropyl methyl cellulose ethers ranges from 15 percent to 35 percent and preferably from 19 to 25 percent. The hydroxypropoxyl substitution of the hydroxypropyl methyl cellulose ethers ranges from 4 percent to 35 percent and preferably from 4 percent to 12 percent.

The molecular weight of hydroxypropyl methyl cellulose can be expressed as the viscosity of the solution thereof in a solvent therefor. Unless otherwise stated, the molecular weight of hydroxypropyl methyl cellulose is given herein as the viscosity of a 2 weight percent solution of hydroxypropyl methyl cellulose in water as measured using a UBBELOHDE viscosimeter at 20° C.

The viscosity is generally about 5 to about 200,000 mPa's. The hydroxypropyl methyl cellulose ethers which are used as suspending agents for the suspension polymerization of ethylenically unsaturated monomers have preferably a viscosity of from about 5 mPa's, most preferably from about 10 mPa's, to about 400 mPa's, most preferably to about 100 mPa's. The viscosities of 5, 10, 100 and 400 mPa's correspond to number average molecular weights ($M_n$) of 10,000, 13,000, 26,000, and 41,000 respectively.

The hydroxypropyl methyl cellulose ethers of the present invention have the above-mentioned methoxyl and hydroxypropoxyl substitution provided that the average molecular weight is less than 50,000. By average molecular weight the number average molecular weight ($M_n$) is meant. The preferred average molecular weight is from 5000, most preferably from 10,000, to 40,000, most preferably to 30,000. A particularly preferred range of the molecular weight is from 13,000 to 26,000 which corresponds to a viscosity of 10 mPa's to 100 mPa's. Provided that when the average molecular weight is more than or equal to 50,000, the methyoxyl substitution is more than 24 percent, preferably from 24.5 percent, most preferably from 25 percent, to 35 percent, preferably to 33 percent, and most preferably to 31 percent.

The hydroxypropyl methyl cellulose ethers of the present invention are, for example, useful as suspending agents for the suspension polymerization of vinyl chloride and a vinyl component monomer other than vinyl chloride.

The hydroxypropyl methyl cellulose ethers used for the purpose of the present invention can be produced according to known methods, for example, as described in U.S. Pat. Nos. 2,949,452, and 3,388,082, the teachings of which are included herein by reference. The levels of substitution of the hydroxypropyl methyl cellulose ethers of the present invention can be achieved by increasing the amounts of propylene oxide and methyl chloride and reaction times until the desired substitution level has been reached.

The hydroxypropyl methyl cellulose ethers described herein are used as suspending agents for the suspension polymerization of vinyl chloride and a vinyl component monomer other than vinyl chloride. Preferably, these hydroxypropyl methyl cellulose ethers are used as secondary or co-suspending agents, i.e. together with other suspending agents, for suspension polymerization of vinyl chloride.

The polymerization is done on 100 parts of vinyl chloride or a total of 100 parts of vinyl chloride and vinyl component monomer.

By the term "vinyl component," it is meant a vinyl type monomer other than vinyl chloride. Such monomers are well known to the art and to the literature and include esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; and vinyl aliphatic esters containing from 3 to 18 carbon atoms; esters of methacrylic acid wherein the ester portion has from to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms and preferably 2 to 4 carbon atoms such as ethylene, propylene and isobutylene; and mixtures of any of the above types of monomers and other vinyl monomers copolymerizable therewith known to the art and to the literature. An amount of vinyl chloride monomer is utilized to produce a copolymer containing from about 70 to about 95 percent by weight, and preferably from about 80 to about 93 percent by weight of vinyl chloride repeating units therein. The remainder of the copolymer is made up of the one or more above-noted vinyl component monomers, for example, vinyl acetate. Thus, an amount of vinyl component monomer when utilized to produce a copolymer is from about 5 to about 30 percent and preferably from about 7 to about 20 percent by weight of vinyl component repeating units therein.

For the production of some goods, vinyl chloride polymers or copolymers must be able to absorb plasticizers. Accordingly, particle porosity is an important property of these resins since it determines the ability of the resin to absorb liquid plasticizers. The porosity of the polymer particles can be easily controlled or increased by using suspending agents such as hydroxypropyl methyl cellulose ethers. The suspending agents are generally used in the amount of 0.02 to 0.5, preferably of 0.05 to 0.3, most preferably 0.05 to 0.20 parts by weight per 100 parts of vinyl chloride or vinyl chloride and vinyl component monomer.

Methods for preparing polyvinyl chloride by suspension polymerization of vinyl chloride are known in the art. Such polymerization processes are for example described in DE 2153727-B and in DD patent specification 160354, the teachings of which are included herein by reference. This procedure generally relates to the utilization of an aqueous system wherein the monomer is in a dispersed phase, an initiator is dissolved in a monomer phase, and the formed polymer is a dispersed solid.

The process of this invention may be used in the production of polyvinyl chloride as well as copolymers that are formed by the copolymerization of vinyl chloride with a water-insoluble vinyl component monomer that is copolymerizable therewith. Suitable comonomers are disclosed above as "vinyl component."

The molecular weight of PVC may be related to its inherent viscosity which is determined herein by dissolving 0.24 gram of the resin in 50 ml of cyclohexane while mildly heating and agitating according to ASTM procedure D-1243 (1966). The PVC resin starting material useful in the process of this invention preferably has a molecular weight such that it possesses an $n_1$ (inherent viscosity) in the range from about 0.2 to about 1.4, the most commonly used PVC resins having an $n_1$ in the range from about 0.4 to about 1.1.

The PVC can be prepared with at least one mercaptan or a non-mercaptan chain transfer agent composition. The mercaptan chain transfer agent composition comprises (a) at least one mercaptan chain transfer agent and (b) at least one non-polymerizable material which is miscible with the mercaptan chain transfer agent Suitable mercaptans include water soluble mercaptans such as 2-mercaptoethanol, 3-mercaptopropanol, thiopropyleneglycol, thioglycerine, thioglycolic acid, thiohydracrylic acid, thiolactic acid, and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, alkyl mercaptans, and the like. The preferred mercaptan is 2-mercaptoethanol, however, any chain transfer agent having a mercapto (—SH) group would be acceptable.

The chain transfer composition comprises, in addition to the mercaptan, at least one non-polymerizable material which is miscible with the mercaptan and is substantially insoluble in water. The term non-polymerizable as used herein means that the material does not form a part of the vinyl chloride polymer chain in the sense that a traditional comonomer would form. The nonpolymerizable material may, in some cases, graft polymerize onto the vinyl chloride polymer chain but this is not normally considered a copolymer. The term substantially insoluble in water as used in this specification means that the material has less than 5 percent solubility in water. The non-polymerizable material may be a monomer, oligomer or a polymer. Suitable non-polymerizable materials include dioctyl phthalate, low molecular weight poly(caprolactone), polysilicones, esters of glycerols, polyesters, water insoluble esters of fatty acids with OH terminated polyoxyethylene and polyoxypropylene, esters of polyols, esters of monoacids and polyacids, esters of organic polyphosphates, phenyl ethers, ethoxylated alkylphenols, sorbitan monostearate and sorbitan monooleate and other sorbitol esters of fatty acids. The choice of material is not critical as long as the material is non-polymerizable with the vinyl chloride monomer and is substantially insoluble in water.

The chain transfer composition must contain at least enough non-polymerizable material to encapsulate the mercaptan chain transfer agent. This amount varies according to the type and amount of chain transfer agent used. Usually, the chain transfer composition must contain at least an equal amount in weight of non-polymerizable material as chain transfer agent in order to encapsulate or host the chain transfer agent. Preferably, the composition contains at least twice as much weight of non-polymerizable material as chain transfer agent. Other non-essential ingredients may be used in the chain transfer compositions of this invention but are not preferred.

The chain transfer compositions are formed by mixing the two essential ingredients together. The method used to mix the ingredients is not critical and may be any of the known methods used by those skilled in the art. The ingredients may even be charged to the polymerization reactor and mixed before adding the other polymerization ingredients but is preferably mixed outside the reactor.

Because of the detrimental effects that mercaptans, such as 2-mercaptoethanol have on colloidal stability, it is necessary to mix the 2-mercaptoethanol with the non-polymerizable material before adding it to the reaction medium. The non-polymerizable material serves as a host material for the chain transfer agent. This procedure surprisingly eliminates the adverse effects of 2-mercaptoethanol on colloidal stability. It is believed that the non-polymerizable material averts the adverse effect of 2-mercaptoethanol on colloidal stability via encapsulation, complexation or interaction and, thus, allows relatively high levels of 2-mercaptoethanol to be introduced to the reaction medium prior to the start of polymerization. The term "encapsulation" as used herein is not intended as the traditional meaning of encapsulation which is to coat or contain and the result is a heterogeneous system. The chain transfer composition of this invention is homogeneous.

The level of chain transfer composition used to make the low molecular weight polymers will be described in terms of the level of mercaptan in the composition. The level of mercaptan used is greater than 0.03 part by weight per 100 parts by weight of vinyl chloride or vinyl component monomer. The preferred levels of mercaptan range from about 0.03 to about 5.00 parts by weight per 100 parts of monomer or comonomers, and, most preferably, from 0.10 to 1.50 parts.

When high amounts of mercaptan, such as 2-mercaptoethanol, are used, it is desirable to not charge the entire amount of chain transfer agent at the beginning of polymerization since 2-mercaptoethanol has a diminishing effect on molecular weight above about the 1.5 parts level. Therefore, if, for example, 3.0 parts were used, it would be advisable to add only up to 1.5 parts at the beginning of polymerization and to gradually add the remainder during polymerization. Amounts added at the beginning which are greater than 1.5 parts do not result in colloidal instability. However, for the most efficient use of chain transfer agent, it is preferred to not add more than 1.5 parts before the beginning of polymerization. This preferred initial level could, of course, be different for different mercaptans. The above described preferred procedure is for 2-mercaptoethanol.

If less than 0.25 part by weight of chain transfer agent is used, then all of the chain transfer agent will be added in the form of the chain transfer composition before the beginning of polymerization. If more than 0.25 part is used, then at least 0.25 part will be added in the form of the chain transfer composition before the beginning of polymerization and the remainder may be added later. To gain the most efficiency of the chain transfer agent, no more than 1.5 parts by weight should be added before the start of polymerization. For best results, at least 50 percent of the chain transfer agent, preferably 100 percent, is added to the polymerization medium prior to the start of polymerization. Any amount not added at the start and not encapsulated should be added after the polymerization has reached about 10 percent conversion to maintain colloidal stability. Except for the use of the chain transfer composition, the polymerization is much the same as in the conventional polymerization of vinyl chloride in an aqueous medium.

Another class of chain-transfer agents that are used in the process of this invention are mercapto organic compounds having at least one beta-ether linkage that have the structural formula

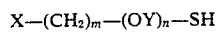
$$X-(CH_2)_m-(OY)_n-SH$$

wherein X represents hydrogen or —SH, Y represents an alkylene group having 1 to 6 carbon atoms, and m and n each represents a number in the range of 1 to 10.

A preferred group of beta-ether linkage chaintransfer agents includes mercapto organic compounds that have the structural formula

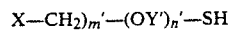
$$X-CH_2)_{m'}-(OY')_{n'}-SH$$

wherein X represents hydrogen or —SH, Y' represents an alkylene group having 2 to 4 carbon atoms, and m' and n' each represents a number in the range of 2 to 4.

Illustrative of the beta-ether linkage chaintransfer agents that can be used in the practice of this invention are the following compounds:
mercaptomethyl ethyl ether,
2-mercaptoethyl ethyl ether,
2-mercaptoethyl propyl ether,
2-mercaptoethyl butyl ether,
3-mercaptopropyl methyl ether,
3-mercaptopropyl ethyl ether,
3-mercaptopropyl butyl ether,
2-mercaptopropyl isopropyl ether,
4-mercaptobutyl ethyl ether,
bis-(2-mercaptoethyl) ether,
bis-(3-mercaptopropyl) ether,
bis-(4-mercaptobutyl) ether,
(2-mercaptoethyl) (3-mercaptopropyl) ether,
(2-mercaptoethyl) (4-mercaptobutyl) ether,
ethoxypolypropylene glycol mercaptan,
methoxypolyethylene glycol mercaptan,
and the like and mixtures thereof.

Among the preferred beta-ether linkage chaintransfer agents are 2-mercaptoethyl ethyl ether and bis(2-mercaptoethyl) ether.

The amount of the beta-ether linkage chaintransfer agent that is used in the polymerization reaction is that which will provide a polymer having the desired molecular weight or degree of polymerization. In most cases from 0.01 percent to 5 percent by weight, based on the weight of the monomer component, is used. When a low molecular weight product that has a viscosity, $n_1$, in the range of 0.20 to 0.60 is desired, the amount of chain transfer agent used is preferably in the range of 0.1 percent to 2.0 percent by weight, based on the weight of the monomer.

The non-mercaptan chain transfer agents that can be utilized in the practice of this invention are monoolefins containing from 2 to about 18 carbon atoms. The olefinic double bond may be terminal (alpha) or internal. Also functioning as non-mercaptan chain transfer agents are chlorinated hydrocarbons containing from 1 to about 10 carbon atoms. These chlorinated hydrocarbons may be mono-, di-, or tri-chlorinated. A representative chlorinated chain transfer agent is 1,1,2-trichloroethane. Other non-mercaptans chain transfer agents are aldehydes containing from 2 to 18 carbon atoms and ethers containing from 2 to 18 carbon atoms, as well as cyclic ethers such as furan and tetrahydrofuran.

The level of non-mercaptan chain transfer agent used to make the low molecular weight polymers will be described in terms of the level of non-mercaptain chain transfer agent in the composition. This level is generally greater than 0.1 up to about 10 parts by weight per 100 parts by weight of vinyl chloride or vinyl chloride and vinyl component monomer. The preferred levels range from 0.5 to about 10 parts by weight per 100 parts of monomer or comonomers, and, most preferably from 0.5 to 5 parts.

The process of this invention uses polymerization initiators. The polymerization initiators used in this process are known in the art and are selected from the conventional free radical initiators such as organic peroxides and azo compounds. The particular free radical initiator employed will depend upon the monomeric material(s) being polymerized, the molecular weight and color requirements of the polymer, the temperature of polymerization, and the type of process such as suspension or emulsion process, etc. Insofar as the amount of initiator employed is concerned, it has been found that an amount in the range of about 0.005 part by weight to about 1.00 part by weight, based on 100 parts by weight of the monomer or monomers being polymerized, is satisfactory. However, it is preferred to employ an amount of initiator in the range of about 0.01 part by weight to about 0.20 part by weight based on 100 parts by weight of monomer(s). For the process as described herein, examples of suitable initiators include lauryl peroxide, azobisisobutylonitrile, benzoyl peroxide, isopropyldicarbonate, acetyl cyclohexyl sulfonyl peroxide, t-butyl peroxypivalate, t-butyl peroxyactoate, and alpha-cumyl peroxyneodecanoate, the choice depending on the reaction temperature. The preferred initiator is a dual system comprising t-butyl peroxypivalate and alpha-cumyl peroxyneodecanoate. This initiator system results in a reduced residual initiator level in the final product and a shorter high temperature history due to faster reactions.

The suspension polymerization process may be carried out at any temperature which is normal for the monomeric material to be polymerized. Preferably, a temperature in the range of from 0° C. to about 100° C., more preferably from about 40° C. to about 85° C. is employed. In order to facilitate temperature control during the polymerization process, the reaction medium is kept in contact with cooling surfaces cooled by water, brine, evaporation, etc. This is accomplished by employing a jacketed polymerization reactor wherein the cooling material is circulated through the jacket throughout the polymerization reaction. This cooling is necessary since most all of the polymerization reactions are exothermic in nature. It is understood, of course, that a heating medium can be circulated through the jacket, if necessary.

The above vinyl chloride polymer can be chlorinated in any conventional manner as known to the art and to the literature to contain high amounts of chlorine therein, as for example from about 57 percent by weight up to about 74 percent by weight based upon the total weight of the polymer, preferably from about 61 percent to about 74 percent by weight, and most preferably from about 63 percent to 72 percent by weight based upon the total weight of the copolymer.

To produce CPVC commercially, and preferably economically, it has been found that a relatively concentrated aqueous suspension of PVC must be chlorinated. But such a relatively concentrated suspension cannot be routinely uniformly chlorinated to get high quality. By "uniformly chlorinated" we describe a CPVC resin having a density which does not deviate more than 20 percent from the mean density, and a surface area which does not deviate more than 30 percent from the mean surface area. By "relatively concentrated" we refer to a concentration of about 15 to about 35 percent by weight of PVC solids in the suspension. Since the physical characteristics of such a relatively concentrated suspension of PVC in water are quire different from those having relatively low concentrations, the problems of chlorination in each are quire different, such factors as viscosity of the suspension, clumping of macrogranules, penetration of ultraviolet light, diffusion of gases into and out of the liquid and solid phases present, inter alia, not lending themselves to extrapolation by known methods. It has been found that a concentration of PVC higher than the specified range results in non-uniform product, while concentrations below 15 percent yield uniform product, but is not economical. By "aqueous suspension" of PVC we refer to a slurry-like mixture of PVC macrogranules suspended in water. Though, initially the water is not deliberately acidified by the addition of acid, HCl acid is formed during the course of the chlorination and is absorbed in the water. The above-specified concentration of PVC in the suspension is found to yield high output of CPVC for a given reactor volume, without sacrificing the quality of the product, which quality cannot be compromised. This process is particularly directed to a batch process since wholly different considerations enure to the operation of a continuous process.

It is essential for the purpose of obtaining the desired CPVC product that oxygen be removed from the aqueous suspension before chlorination is initiated. This may be effected in any convenient manner. For example, a hot suspension at a temperature in the range from about 60° C. to about 75° C. and containing about 30 percent PVC may be introduced into a batch reactor and subjected to a vacuum at that temperature so that it boils. Lower temperatures as low as about 20° C. may be employed, but removal of oxygen at such low temperatures is impractical, particularly since the temperature of the suspension is to be raised if it is to be chlorinated by the process of this invention. Removal of oxygen is assisted by agitation of the suspension. After several minutes, depending upon the size of the charge to the reactor, the temperature and the initial oxygen content of the suspension, it is found that essentially all the oxygen has been removed. The same result may be obtained by sparging an inert gas such as nitrogen through the suspension, again preferably, when the suspension is hot, that is, in the range from 60° C. to 75° C. Any conventional test to determine the concentration of oxygen may be used, and it is preferred to have less than 100 ppm of oxygen remaining in the slurry, the less the better.

During the period when oxygen is removed, the temperature of the suspension may be lowered sufficiently to require heating it to return to a temperature within the range from about 60° to about 75° C. which is the preferred starting temperature range in which the photochlorinated reaction is to be initiated. Such heating as may be required is preferably done after $Cl_2$ is sparged into the suspension from a liquid $Cl_2$ cylinder until the pressure in the reactor reaches about 25 psig, at which point the suspension is saturated with $Cl_2$. It is preferred that this pressure be somewhat higher, that is in the range from about 35 psig to about 100 psig, to get the optimum results, though a pressure as low as 10 psig gives acceptable results. Pressures higher than 100 psig may be employed, though it will be recognized that the cost of equipment for operation at such higher pressures adversely affects the economics of the process. The amount of $Cl_2$ charged to the reactor is determined by the weight loss in the $Cl_2$ cylinder.

After the reactor is pressurized with chlorine, the reactor is preferably brought up to a "soak" temperature in the range from about 60° C. to about 75° C. at which soak temperature the suspension is maintained for a soak period in the range from about minute to about 45 minutes. The soak period appears to have an unexpectedly beneficial function. It provides $Cl_2$ the opportunity to diffuse into the macrogranules where it will do the most good.

A longer soak period, under pressure, may be used if the soak temperature is lower than 60° C., but a soak period longer than 45 minutes is undesirable. An unnecessarily long soak period only defeats a primary object to this water chlorination process, namely to speed up the production of high quality CPVC.

It must be recognized that the relatively high pressure in the reactor, which pressure is preferably maintained constant also retards the removal of HCl and HOCl from within the macrogranules, and if too high, adversely affects the porosity of the macrogranules to the detriment of the stability of the CPVC product. Again, it is preferred to maintain agitation of the suspension during soaking, though the intensity of agitation may be substantially lower than that preferred during the photo-chlorination step to follow. In fact, the aqueous suspension is preferably kept agitated from the time the preheated PVC suspension is charged to the reactor, until the end, when the CPVC slurry is ready to be dumped.

Irrespective of the length of the soak period and the temperature at which the suspension is maintained during the soak period, it is essential to complete the chlorination reaction under photo-illumination, preferably with ultraviolet light, or the desired conversion of PVC to CPVC product does not occur.

It is feasible to carry out the process of this invention without a soaking step, but such a process is economically impractical. For example, after removing oxygen from an aqueous PVC suspension charged to the reactor, the lights may be turned on prior to introducing the chlorine. Chlorination proceeds at a rate which depends upon the pressure and temperature within the reactor, higher rates being favored at higher temperature and pressure. When pressure and temperature are raised to a level sufficient to give a favorable rate without a soaking step, the uniformity of the CPVC product suffers.

After the "soak" period, the suspension is photo-illuminated with a bank of ultraviolet lights in the manner described in U.S. Pat. No. 2,996,489, except that it has been found that a relatively high and constant intensity of light should be used, preferably in the range from about 5 watts to about 50 watts per gallon of suspension, if high rates of chlorination with a relatively concentrated suspension are to be obtained. With a preferred high level of photo-illumination, it has been found that reaction rates far greater than in prior art aqueous suspension chlorination processes may be obtained. Most important, the reaction rates may be achieved without a sacrifice in product quality. For example, in contrast with the process disclosed in U.S. Pat. No. 3,100,762, for chlorinating a non-photo-illuminated suspension, the chlorination of an aqueous suspension of PVC at 60° C. and 40 psig by the instant process, with a soak period, photo-illumination and "temperature ramping" as will be described hereinbelow, produces a reaction rate of from 0.01–0.04 $min^{-1}$ and a HDT of a test recipe of from 100° C. to 130° C. The reaction rate is computed on the basis of it being a first order reaction, using the formula $$k = -2.303\,[l_n(1-x)]/t$$

where, x is fractional conversion to one chlorine atom per carbon atom, and, t is time (in minutes).

It has been found that carrying out a chlorination reaction under widely fluctuating elevated temperature and pressure while photo-illuminating the suspension does not produce CPVC of adequate quality and stability. It is essential, at elevated pressure, to commence the chlorination reaction at a temperature in the range from about 60° C. to about 75° C., and then to finish the reaction at an even higher temperature generated because of the reaction. No additional heat is required to be added to the reactor because the self-generated heat is sufficient to produce the desired increase in temperature, until it reaches a finishing temperature in the preferred range of from about 80° C. to about 100° C. A finishing temperature as high as 120° C. may be employed if the pressure is high enough. The "finishing temperature" is so termed because it is the temperature at which the chlorination reaction is "finished," that is a preselected chlorine content in the CPVC has been attained. The precise finishing temperature at which the autogenously ramped temperature levels off, will depend on several factors. It is most preferred to adjust the soak temperature, the mass of resin, and the level of photo-illumination so that the temperature is "ramped" by the self-produced heat of reaction until it levels off at a finishing temperature of about 110° C.

It will now be evident to one skilled in the art that the temperature at which the chlorination occurs should, at all times be below the Tg of the resin in the suspension, whether the resin is a mass polymerized PVC, a suspension polymerized PVC, or a mixture of PVC and CPVC. For example, chlorination of a Geon $^R$ 103EP or 30 PVC resin having a Tg of about 84° C., must be commenced at a temperature below 84° C., though as the reaction progresses, the reaction temperature maybe permitted to rise because the Tg of the resin rises as the reaction proceeds to completion. In other words, as the reaction proceeds, the Tg of the mixture of remaining PVC and the CPVC formed, continuously increases. This process requires that the autogenously ramped temperature be maintained at all times below the effective Tg of the solid resins. It will also be evident to one skilled in the art, that the problem of maintaining the finishing temperature of the reaction substantially constant at about 90° C. (say) during the exothermic chlorination reaction in a batch reactor requires highly effective heat transfer control or the resin will "burn." This problem is exacerbated as the size of the reactor increases, and is especially onerous in a 2500 gallon, or larger, reactor.

The progress of the chlorination reaction depletes the free chlorine in the reactor and the additional $Cl_2$ is introduced into the reactor to maintain the pressure, and to make sure that the desired level of conversion of PVC to produce CPVC is attained. The level of conversion is estimated by the amount of $Cl_2$ fed from the $Cl_2$ feed cylinder. It is not desirable to permit the pressure in the reactor to fluctuate more than 20 percent as the effects of wide fluctuations are reflected in poorer quality CPVC.

When sufficient chlorine is added to the reactor to result in the desired conversion of about 50 percent conversion (say) of PVC, that is, about 50 percent of all the vinyl chloride (monomeric) units have been chlorinated with at least one atom of chlorine, or, to result in a desired density of CPVC in the range from about 1.50 to about 1.65 g/cc, more preferably from about 1.536 to about 1.656 g/cc, the flow of chlorine to the reactor is stopped. The suspension is not cooled but dumped to be centrifuged and the CPVC freed from the aqueous phase, after which HCl acid is removed from the CPVC, preferably by neutralizing the CPVC with an aqueous solution of an alkali. The CPVC product is then washed with water to free the CPVC of residual alkali, and dried, all in a conventional manner, except that the temperatures at which the operations are carried out may be in the range from about 60° C. to about 100° C., which are higher than conventionally used.

The chlorinated products of this invention have densities in the range from about 1.5 to about 1.7 g/cc at 25° C., and a HDT in the range from about 128° C. (for 65 percent Cl content) to about 170° C. (for 72 percent Cl content). The increase in HDT over conventionally prepared CPVC is ascribed to the probability that there are more 1,1,2-trichloroethylene units in a CPVC molecule than generally present, and which units are not otherwise obtained, at least in an amount significant enough to increase HDT so markedly, even if a conventional photo-illumination is carried out at about atmospheric pressure, with or without a swelling agent, for an extended period of time.

The CPVC is useful in the rigid vinyl field for the manufacture of pipe, ductwork, tanks, appliance parts, etc., especially where the products will handle or contact hot water and other hot, corrosive liquids. It has found particular utility in the production of hot waterpiping for industrial and domestic use. Ordinarily, a small amount of another resin or rubber, e.g., chlorinated polyethylene, styrene-acrylonitrile copolymer, or chlorinated isobutylene is blended with the chlorinated PVC resin to improve its shock resistance and mechanical processability. The pigments, lubricants and stabilizers well known in the vinyl art also can be incorporated therein.

To further illustrate the present invention, the following specific examples are given, it being understood this is merely intended in an illustrative and not a limitative sense. In the examples, all parts and percentages are by weight unless otherwise indicated.

The below table shows the preparation of a polyvinyl chloride homopolymer utilizing 100 parts vinyl chloride, 150 parts water, and 0.1 part of cellulose ether having a methoxyl substitution of 22 percent and a hydroxyl substitution of 8 percent. Examples and 2 are control examples utilizing polyvinyl alcohol. Examples 3 through 12 are prepared utilizing additional hydroxypropylmethyl cellulose ether, hereinafter referred to as cellulose ether. This cellulose ether has a viscosity of about 15.5 mPa's and is commercially available from Dow Chemical under the trade name XZ 87310. Numbers in parentheses indicate parts by weight of additive, chain transfer agent and initiators. Where a mercaptan chain transfer agent is used, there is also employed a nonpolymerizable material of a 500 molecular weight polycaprolactone (0.34 parts). The inherent viscosity is $n_1$, APS is average particle size in microns, PSD is particle size distribution, and Hg Por is mercury porosity. For the initiators TBP=t-butyl peroxyactoate, TBPP=t-butyl peroxypivalate, ACPND=alpha-cumyl peroxyneodecanoate, TAPND=t-amyl peroxyneodecanoate, TAPP=t-amyl peroxypivalate, and TBPNB=t-butyl peroxyneodecanoate.

TABLE I

| Example | Additional Dispersant Polyvinyl Alcohol | Additional Dispersant Cellulose Ether | Chain Transfer Agent | Initiators | Reaction Temp °C. |
|---|---|---|---|---|---|
| 1* | (0.10) | — | None | TBP/TBPP (.046/0093) | 81.7 |
| 2* | (0.10) | — | 2-Mercapto-ethanol (.17) | ACPND/TBPP (.04/.065) | 70 |
| 3 | — | (.12) | None | TBP/TBPP (.02/.019) | 81.7 |
| 4 | — | (.10) | 2-Mercapto-ethanol (.17) | ACPND/TBPP (.035/.065) | 70 |
| 5 | — | (.15) | 2-Mercapto-ethanol (.17) | ACPND/TBPP (.04/.065) | 70 |
| 6 | — | (.15) | 2-Mercapto-ethanol (.15) | ACPND/TBPP (.035/.060) | 70 |
| 7 | — | (.15) | 2-Mercapto-ethanol (.15) | ACPND/TBPP (.04/.09) | 70 |
| 8 | — | (.15) | Isobutylene (2.5) | TAPND/TAPP (.02/.085) | 70 |
| 9 | — | (.15) | Isobutylene (7.0) | ACPND/TBPND (.08/.14) | 53 |

TABLE I-continued

| | | | | | |
|---|---|---|---|---|---|
| 10 | — | (.15) | Propylene (10.0) | ACPND/TAPND (.09/.12) | 65 |
| 11 | — | (.09) | 2-Mercapto-ethanol (.14) | ACPND/TBPP (.035/.65) | 70 |
| 12 | — | (.09) | 2-Mercapto-ethanol (.14) | ACPND/TBPP (.035/.65) | 70 |

| Example | Reaction Time (Min.) | $n_1$ | APS | PSD | Hg Por |
|---|---|---|---|---|---|
| 1 | 274 | .520 | 98 | 56 | .159 |
| 2 | 211 | .440 | 166 | 36 | .154 |
| 3 | 246 | .552 | 102 | 40 | <.02 |
| 4 | 255 | .479 | 78 | 45 | .093 |
| 5 | 272 | .4436 | 174 | 62 | .119 |
| 6 | 240 | .47 | 192 | 68 | .112 |
| 7 | 241 | .316 | 134 | 69 | .111 |
| 8 | 400 | .433 | 198 | 62 | .086 |
| 9 | 600 | .442 | 124 | 99 | .140 |
| 10 | 418 | .455 | 105 | 55 | .120 |
| 11 | 278 | .467 | 77 | 47 | .077 |
| 12 | 235 | .467 | 76 | 46 | .087 |

*Control Examples

Examples 13 and 14 deal with the preparation of chlorinated polyvinyl chloride from polyvinyl chloride that was made using polyvinyl alcohol.

EXAMPLE 13

An externally jacketed glass-lined vessel equipped with a mercury vapor light and an agitator was charged with slurry to about 75 percent of capacity. The slurry consisted of 82 percent deionized water and 18 percent polyvinyl chloride (PVC). The PVC was produced using the standard polyvinyl alcohol surfactant system as prepared in Example 1. This slurry was then heated to 60° C. and the reactor was sealed. A vacuum was pulled on the reactor to remove oxygen and other gasses. The vacuum was broken with chlorine which was also used to pressurize the reactor to 35 psig. This slurry was allowed to agitate for about 15 minutes to allow the chlorine to diffuse into the PVC particles. The reaction was initiated by turning on the mercury vapor light. As the reaction proceeded, chlorine was added to maintain the pressure until the chlorine to PVC ratio of 0.4:1.0 was reached. During the reaction, the temperature of the slurry was allowed to increase to 90° C., from the heated reaction, and then was controlled at this temperature. After all the chlorine was in, the reaction continued until the reactor was under vacuum, indicating that all of the chlorine had been reacted. The slurry was then neutralized and dried. The reaction took 270 minutes and the final percent chlorine level on the polymer was 64.1 percent.

EXAMPLE 14

The same equipment and procedures as in Example 13 were used for this example as well. This example employs the PVC of Example 2 that was made using polyvinyl alcohol and a nonpolymerizable material for the chain transfer agent.

The remaining examples, 15 and 16, both prepared as per Example 13, employ a PVC that was made using a cellulose ether rather than polyvinyl alcohol. Table II summarizes all the chlorinated polyvinyl chloride products of Examples 13-16. Color properties were measured on injected molded compounds of Examples 13, 14 and 16 using Example 15 as a reference (DE of zero by definition). Color properties were measured with the ACS 1400 spectrophotometer, using the CIE test procedure and color differentiating formula. DE is a qualitative measurement of the total color difference between a color standard (Example 15 in this instance) and a sample. This difference includes the lightness and chromaticity differences. The lower the DE value, the closer the colors will appear to each other when examined visually.

Table II also summarizes Dynamic Thermal stability (DTS) on control Example 13 and present invention Examples 15 and 16. Control Example 13 has a lower time to the onset of the degradation (and induced crosslinking). Inventive Examples 15 and 16 exhibit much longer times to the onset of degradation (and induced crosslinking) indicating a more stable resin.

TABLE II

| Example | Polyvinyl Example | $n_1$ | Chloride Time (Min) | $Cl_2$ % Cl | Properties of Chlorinated Polyvinyl Chloride | |
|---|---|---|---|---|---|---|
| | | | | | DE | Time (min.) |
| 13 (Control) | 1 | .520 | 270 | 64.1 | 18.5 | 22 |
| 14 (Control) | 2 | .440 | 198 | 65.2 | 22.9 | 27 |
| 15 | 3 | .552 | 140 | 63.4 | 0 | 35 |
| 16 | 12 | .467 | 131 | 63.6 | 5.4 | 28 |

Table III is directed to HCl elimination at 170° C. This test is a measure of the stability of the CPVC resins. CPVC prepared from a polyvinyl alcohol PVC exhibit a higher mole percent HCl evolution versus CPVC prepared from a cellulose ether PVC. CPVC prepared from a cellulose ether PVC is more stable than CPVC prepared from a polyvinyl alcohol PVC.

TABLE III

| | Comparison of CPVC Samples ($n_1 = 0.54$) | | |
| --- | --- | --- | --- |
| Minutes | Mole % HCl Evolved Ex. 13 PVC Made From Polyvinyl Alcohol | Mole % HCl Evolved Ex. 15 PVC Made From Cellulose Ether | Mole % HCl Evolved Ex. 15 (repeat) |
| 0 | 0.0000 | 0.0000 | 0.0000 |
| 10 | 0.026 | 0.014 | 0.019 |
| 20 | 0.058 | 0.033 | 0.039 |
| 30 | 0.088 | 0.053 | 0.058 |
| 40 | 0.118 | 0.068 | 0.078 |
| 50 | 0.146 | 0.087 | 0.097 |
| 60 | 0.175 | 0.106 | 0.118 |

While in accordance with the Patent Statutes, the best mode and preferred embodiment has been set forth, the scope of the invention is not limited thereto, but rather by the scope of the attached claims.

What is claimed is:

1. A method for producing a chlorinated vinyl chloride polymer comprising:
   polymerizing 100 parts by weight vinyl chloride, or vinyl chloride and vinyl component monomer in the presence of
   from about 0.03 to about 5.00 parts by weight of a chain transfer composition comprising at least one mercaptan chain transfer agent and at least one non-polymerizable material which is characterized by being miscible with said mercaptan and substantially insoluble in water, and from about 0.02 to 0.5 parts by weight of at least one surfactant characterized in that the surfactant is a hydroxypropyl methyl cellulose ether having a methoxyl substitution of from about 15 percent to about 35 percent and a hydroxypropoxyl substitution of from about 4 percent to about 35 percent to form an intermediate, and
   chlorinating said intermediate to obtain a chlorinated vinyl chloride polymer having improved color.

2. The method of claim 1, wherein the weight ratio of vinyl chloride:vinyl component monomer is from about 70:30 to about 95:5.

3. The method of claim 2, wherein the weight ratio of vinyl chloride:vinyl component monomer is from about 80:20 to about 93:7.

4. The method of claim 3, wherein the vinyl component monomer is esters of acrylic acid or methacrylic acid wherein the ester portion contains from 1 to about 12 carbon atoms, vinyl acetate, vinyl aliphatic esters containing from about 3 to about 18 carbon atoms, styrene and styrene derivatives containing from about 8 to about 15 carbon atoms, or mixtures thereof.

5. The method of claim 3, wherein the intermediate has an inherent viscosity of from about 0.2 to about 1.4.

6. The method of claim 5, wherein the intermediate has an inherent viscosity of from about 0.4 to about 1.1.

7. The method of claim 6, wherein the hydroxypropyl methyl cellulose ether has a methoxyl substitution of from about 19 percent to about 25 percent and a hydroxypropyloxyl substitution of from about 4 percent to about 12 percent.

8. The method of claim 7, wherein the hydroxypropyl methyl cellulose ether is present at from about 0.05 to about 0.30 parts by weight.

9. The method of claim 8, wherein the hydroxypropyl methyl cellulose ether is present at from about 0.05 to about 0.20 parts by weight.

10. The method of claim 9 wherein the intermediate is formed using from about 0.03 to about 5.00 parts by weight of a chain transfer composition comprising at least one mercaptan chain transfer agent wherein the mercaptan is 2-mercaptoethanol and at least one non-polymerizable material comprising polycaprolactones, polysilicones, esters of glycerols, esters of poly acids, sorbitan monostearate, sorbitan monooleate or sorbitol esters of fatty acids, said non-polymerizable material is characterized by being miscible with said mercaptan and substantially insoluble in water.

11. The method of claim 10 wherein the hydroxypropyl methyl cellulose ether is present at from about 0.05 to about 0.3 parts by weight.

12. The method of claim 11 wherein all the chain transfer composition is added to the polymerization medium prior to the start of the polymerization reaction.

13. The method of claim 12 wherein a dual free radical initiator system is employed.

14. The method of claim 1 wherein the intermediate is formed using from about 0.01 to about 10.00 parts by weight of a chain transfer composition comprising at least one non-mercaptan chain transfer agent.

15. The method of claim 9 wherein the intermediate is formed using from about 0.01 to about 10.00 parts by weight of a chain transfer composition comprising at least one non-mercaptan chain transfer agent, said non-mercaptan chain transfer agent comprising propylene, 1-butene, 2-butene, isobutylene, or 1,1,2-trichloroethane.

16. The method of claim 15 wherein all the chain transfer composition is added to the polymerization medium prior to the start of the polymerization reaction.

17. The method of claim 16 wherein a dual free radical initiator system is employed.

* * * * *